May 2, 1933.  S. GOLDREI  1,906,459
EGG TESTING APPARATUS
Filed Oct. 7, 1930
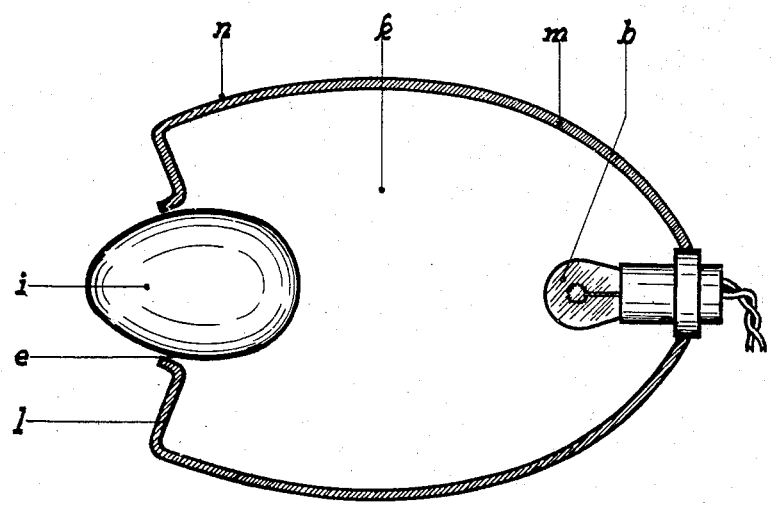
Witnesses:
Inventor:

Patented May 2, 1933

1,906,459

UNITED STATES PATENT OFFICE

SIMON GOLDREI, OF LEIPZIG, GERMANY, ASSIGNOR TO THE FIRM S. B. GOLDREI, OF LEIPZIG, GERMANY

EGG TESTING APPARATUS

Application filed October 7, 1930, Serial No. 487,017, and in Germany November 8, 1929.

The testing of eggs to ascertain their goodness is effected in known manner by electrically operated devices, in which an incandescent lamp is enclosed on all sides by a mostly cylindrical casing having an aperture near the lamp.

The eggs to be tested are held in the aperture, where they are illuminated by the incandescent light falling on this portion and lighted through in a make-shift manner, if the external illumination is considerably reduced.

If it is desired to obtain comparatively reliable results, comparatively strong lamps must be employed, and the day—or artificial light, otherwise existing in the room, must be as far as possible shut out so that the weak lighting through the aperture becomes perceivable.

Owing to such imperfect arrangements the testing of the eggs could evidently only be carried out in a perfunctory manner, quite apart from the considerable amount of time, which was required therefor.

These disadvantages are overcome according to the invention which consists of a reflecting ellipsoid of suitable material employed in such a manner, that the source of light is arranged in one focus of the ellipsoid, whereas the articles to be examined, especially eggs, are to be held in the other focus, so that for example on the removal of the one point of the ellipsoid and the shutting off of same with a wall, in which an aperture is provided, a particularly intensive illuminating point can be produced near this aperture, if this point is made equal to the second focus.

As improvement in this form of construction the fact may be mentioned, that one end of the ellipsoid is removed and replaced by a wall with an aperture, the wall being made substantially funnel-shaped, so that from the casing wall opposite the source of light all rays owing to the funnel shaped closure can be projected substantially onto the focus situated near the aperture.

Glass is preferably used as material for the ellipsoid as the glass body can be cast in one piece and the production of the ellipsoid shape which is otherwise difficult can be effected in the most simple manner by casting.

The use of a glass body for the ellipsoid has the further advantage, that the outer side of the glass body can be provided in the most advantageous manners with a mirror foil so that a practically complete reflexion of all the rays from the source of light especially towards the other focus is obtained owing to the mirror foil applied on the outer side of the ellipsoid.

The invention constitutes a technical improvement of considerable commercial importance.

An embodiment of the invention is illustrated by way of example in the only figure of the accompanying drawing, which shows a view of a testing apparatus with ellipsoidal body partly in elevation and partly in section.

According to the drawing a reflecting ellipsoid $k$ made of any suitable material is employed for concentrating light rays from the source of light $b$ onto the article $i$ to be examined in such a manner that in the one focus of the ellipsoid $k$ the source of light $b$ is arranged, whereas the article $i$ to be tested, i. e. an egg, is held in the other focus.

One end of the above described ellipsoid $k$ is removed and replaced by a wall $l$ with an aperture $e$ in such a manner that the wall $l$ is substantially funnel shaped.

Glass $m$ is preferred as material for the ellipsoid, as it is possible to easily make the ellipsoid body at a single casting.

The outer side $n$ of the ellipsoid $k$ made of glass $m$ is finally provided with a mirror foil, so that all rays projected from the source of light $b$ are reflected near the aperture $e$ onto the article $i$ to be examined, i. e. the egg to be tested.

I claim:

1. An egg tester, comprising in combination an ellipsoid having an aperture for accommodating the article to be tested in one focus of the ellipsoid, and a source of light in the other focus of said ellipsoid, the rays from said source of light being concentrated by said ellipsoid onto the article to be tested.

2. An egg tester as specified in claim 12, comprising in combination with the ellipsoid and the source of light, a wall of substantially funnel-shape forming one end of said ellipsoid having a central aperture diametrically opposite said source of light adapted to receive the article to be tested.

3. An egg tester as specified in claim 1, in which the ellipsoid is made of glass coated with a mirror foil.

In testimony whereof I affix my signature.

SIMON GOLDREI.